United States Patent
Han et al.

(10) Patent No.: US 9,731,647 B2
(45) Date of Patent: Aug. 15, 2017

(54) LIGHT EMITTING WHEEL

(71) Applicant: CITIC DICASTAL CO., LTD, Qinhuangdao (CN)

(72) Inventors: Li Han, Qinhuangdao (CN); Fangzheng Hu, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 44 days.

(21) Appl. No.: 15/060,110

(22) Filed: Mar. 3, 2016

(65) Prior Publication Data
US 2016/0257245 A1    Sep. 8, 2016

(30) Foreign Application Priority Data
Mar. 4, 2015 (CN) .......................... 2015 1 0094965

(51) Int. Cl.
B60Q 3/04    (2006.01)
B60Q 1/32    (2006.01)
B60B 7/00    (2006.01)

(52) U.S. Cl.
CPC .............. B60Q 1/326 (2013.01); B60B 7/00 (2013.01); B60B 2900/572 (2013.01)

(58) Field of Classification Search
CPC .................................. B60Q 1/326; B60B 7/00
USPC .......................................................... 362/543
See application file for complete search history.

(56) References Cited

U.S. PATENT DOCUMENTS

| | | | | |
|---|---|---|---|---|
| 3,885,814 A * | 5/1975 | Rizzo | ....................... | B62M 1/10 280/217 |
| 4,176,390 A * | 11/1979 | Galbert | ....................... | B62J 6/20 200/60 |
| 4,708,399 A * | 11/1987 | Mendres | ............... | B60B 7/0006 301/37.41 |
| 6,698,480 B1 * | 3/2004 | Cornellier | ................ | B60B 9/26 152/100 |
| 2002/0057574 A1 * | 5/2002 | Dalton | ....................... | B62J 6/20 362/473 |
| 2006/0092647 A1 * | 5/2006 | Glasser | ...................... | B62J 6/20 362/473 |
| 2006/0125785 A1 * | 6/2006 | McAlindon | ........... | G06F 3/0235 345/156 |
| 2006/0197305 A1 * | 9/2006 | Wichern | ................... | B60B 9/06 280/283 |
| 2009/0052198 A1 * | 2/2009 | Christoff | ................ | B60Q 1/326 362/500 |
| 2011/0182080 A1 * | 7/2011 | Michelotti | .............. | B60B 19/00 362/473 |

* cited by examiner

*Primary Examiner* — Bryon T Gyllstrom
(74) *Attorney, Agent, or Firm* — Hamre, Schumann, Mueller & Larson, P.C.

(57) ABSTRACT

The present invention provides a light emitting wheel, characterized in that, a light emitting device is attached to the light emitting wheel, the light emitting device is composed of a bulb, a first elastomer, a second elastomer, a power supply, a conducting wire and a protective cover. When a vehicle is started, the on-off state of the bulb can be controlled by a switch, the bulb will move towards a direction away from the center of the wheel hub, and a ring of light will be formed due to the phenomenon of persistence of vision. The higher the speed of the vehicle is, the larger the diameter of the ring of light is, so that the vehicle is driven with rich dynamic effect.

10 Claims, 3 Drawing Sheets

LIGHT EMITTING WHEEL

FIELD OF THE INVENTION

The present invention relates to vehicle wheels, and particularly to a wheel with a unique appearance.

BACKGROUND OF THE INVENTION

It is well known that a wheel is a rotating assembly located between a tire and a vehicle axle for bearing loads, and the wheel functions as mounting a tire and bearing various loads between the tire and the vehicle axle. In general, the wheel is composed of a wheel hub, a wheel rim and wheel spokes, the wheel hub is mounted on the vehicle axle or the shaft diameter of a steering knuckle through a tapered roller bearing, a center hole and connecting bolt holes on the periphery of the center hole are arranged on the wheel hub used for connecting the wheel with the vehicle axle, and the wheel rim is used for mounting and fixing the tire, and is provided with a valve hole thereon, and the wheel spokes are used for connecting the wheel hub with the wheel rim.

To make the wheel more beautiful, means, such as coating a luminescent material and the like, are often adopted to shine the wheel. However, the existing light emitting wheels have disadvantages of single light emitting manner and dynamic deficiency, etc. At present, the requirement of vehicle buyers on the appearance of vehicles is increasing so that it is an urgent need to develop a wheel with rich dynamic effect.

SUMMARY OF THE INVENTION

Therefore, the object of the present invention is to provide a light emitting wheel with rich dynamic effect.

To fulfill the aforementioned object, the present invention provides the following technical solutions:

in one aspect of the present invention, a light emitting wheel is provided, characterized in that, a light emitting device is attached to the light emitting wheel, the light emitting device is composed of a bulb 1, a first elastomer 2, a second elastomer 3, a power supply 4, a conducting wire 5 and a protective cover 7, and: one end of the first elastomer 2 is connected to the bulb 1, and the other end of the first elastomer is connected to a first point on the outer side of the wheel; one end of the second elastomer 3 is connected to the bulb 1, and the other end of the second elastomer is connected to a second point on the outer side of the wheel; the conducting wire 5 forms a circuit between the bulb 1 and the power supply 4; the protective cover 7 is transparent and is covered above the bulb 1, the first elastomer 2, the second elastomer 3, the power supply 4 and the conducting wire 5; and the distance from the first point on the outer side of the wheel to the center of the wheel is different from that from the second point on the outer side of the wheel to the center of the wheel; preferably, the light emitting device further comprises a remote switch 8 which controls the electric connection of the power supply 4 and the bulb 1; or preferably, the difference between the distance from the first point on the outer side of the wheel to the center of the wheel and that from the second point on the outer side of the wheel to the center of the wheel is greater than 5 cm; more preferably, the difference is 5-14 cm; and yet more preferably, the difference is 7-10 cm.

In one preferred aspect of the present invention, 1-9 groups of the light emitting devices are attached to the light emitting wheel; preferably, 5-7 groups of the light emitting devices are attached.

In one preferred aspect of the present invention, the first point on the outer side of the wheel is located at one end of a wheel spoke away from the center of the wheel, and the second point on the outer side of the wheel is located at one end of a wheel spoke close to the center of the wheel.

In one preferred aspect of the present invention, the first elastomer 2 and the second elastomer 3 are springs; preferably, the elastomers are light springs.

In one preferred aspect of the present invention, the elastic coefficient of the first elastomer 2 is $k_1$, the elastic coefficient of the second elastomer 3 is $k_2$, the mass of the bulb 1 is m, and the numerical value of $(k_1+k_2)/m$ is $2.0\text{-}20.0\times10^3$ N/(m× kg); preferably, the numerical value of $(k_1+k_2)/m$ is $4.5\text{-}12\times 10^3$ N/(m×kg); more preferably, the numerical value of $(k_1+k_2)/m$ is $5\text{-}10\times10^3$ N/(m×kg).

In one preferred aspect of the present invention, the material of the protective cover 7 is transparent polypropylene or polyester; preferably, the protective cover 7 is fixed on a wheel hub in an adhesion manner.

In one preferred aspect of the present invention, the power supply 4 is a lithium battery mounted with a remote control device.

In one preferred aspect of the present invention, the conducting wire 5 is integrated in the first elastomer 2 and/or the second elastomer 3.

In one preferred aspect of the present invention, the distance from the second point on the outer side of the wheel to the center of the wheel is 13-21 cm and is preferably 15-20 cm, for example, 16-18 cm.

In one preferred aspect of the present invention, at a static state, the distance from the bulb 1 to the center of the wheel is 3-9 cm and is preferably 4-7 cm, for example, 5 cm.

The technical solution of the present invention can be used for fulfilling the following beneficial technical effects: when a vehicle is started, the on-off state of the bulb can be controlled by a switch. To provide centripetal force, the bulb will move towards a direction away from the center of the wheel hub, and an ring of light will be formed due to the phenomenon of persistence of vision. The higher the speed of the vehicle is, the larger the diameter of the ring of light is, so that the vehicle is started with rich dynamic effect, and a unique landscape is formed on the side of the vehicle body.

BRIEF DESCRIPTION OF THE DRAWINGS

Embodiments of the present invention will be described below in detail in combination with the accompanying drawings, wherein.

DETAILED DESCRIPTION OF THE INVENTION

Figure 1:
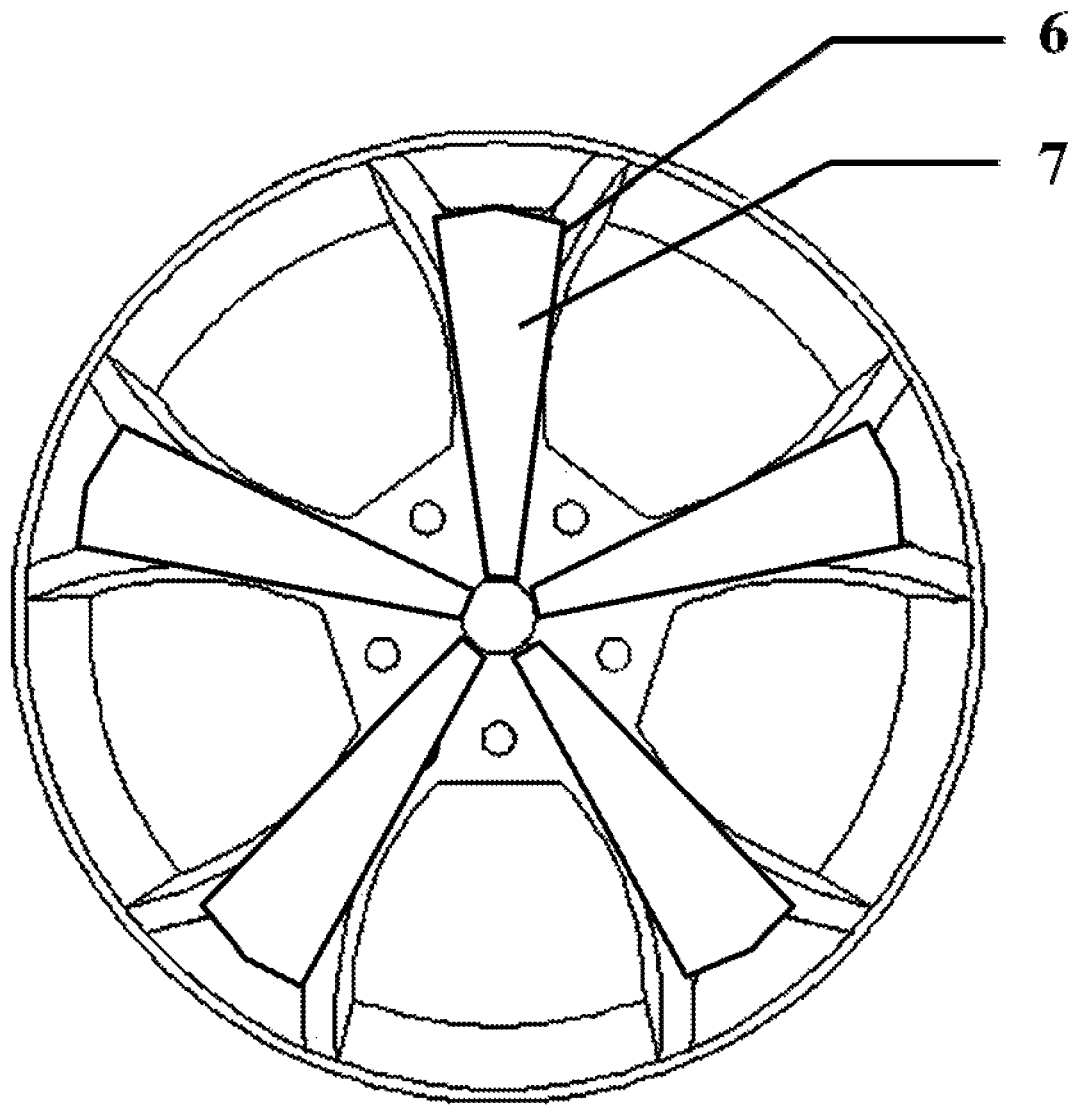
FIG. 1 is a front schematic diagram of a light emitting wheel in the embodiment 1.
Figure 2:
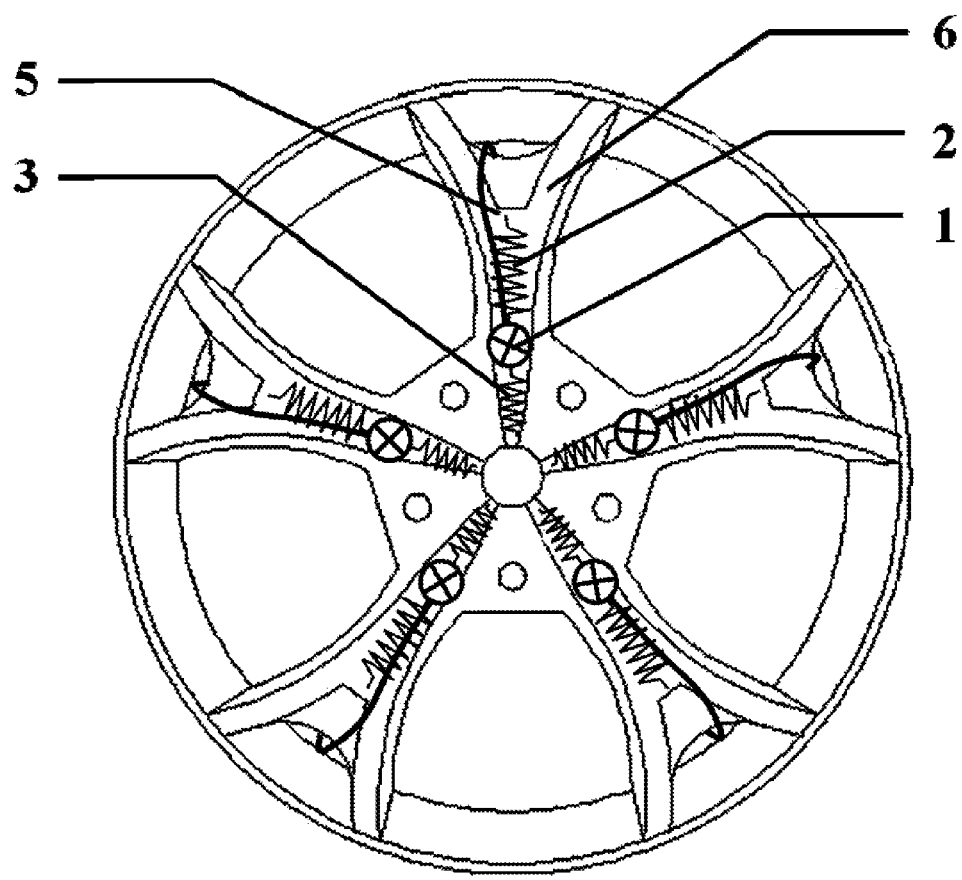
FIG. 2 is an internal schematic diagram of the front of the light emitting wheel in the embodiment 1.
Figure 3:
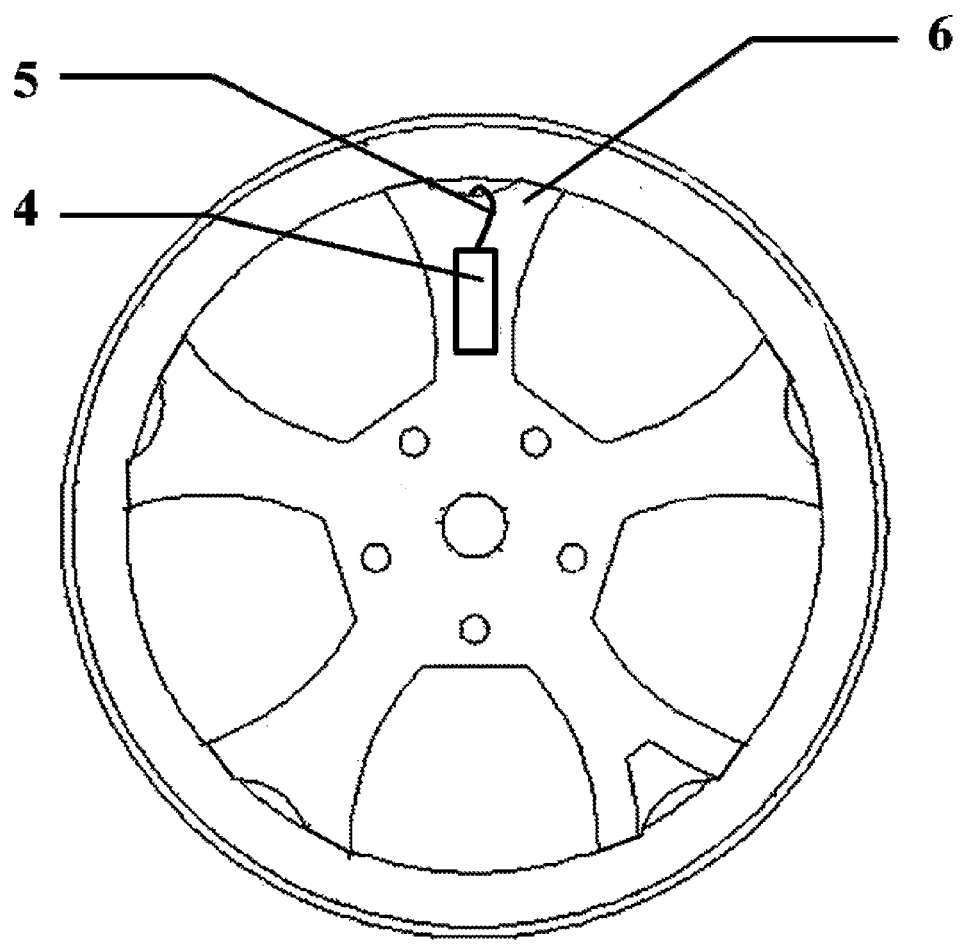
FIG. 3 is an internal schematic diagram of the back of the light emitting wheel in the embodiment 1.

Embodiment 1 Manufacture of Light Emitting Wheel

Wire springs and a bulb are selected, and the $(k_1+k_2)/m$ coefficients thereof are respectively:

TABLE 1

$(k_1 + k_2)/m$ Coefficients of the Wire Springs and the Bulb

| Group number | $(k_1 + k_2)/m$ coefficient Unit: $10^3$ N/(m × kg) | Distance/cm from the bulb 1 to the center of the wheel at a static state | Distance/cm from the second point on the outer side of the wheel to the center of the wheel |
|---|---|---|---|
| 1 | 2.0 | 3 | 21 |
| 2 | 4.5 | 4 | 18 |
| 3 | 6.0 | 5 | 20 |
| 4 | 8.0 | 7 | 15 |
| 5 | 9.5 | 5 | 13 |
| 6 | 10.0 | 9 | 20 |
| 7 | 12.0 | 4 | 16 |
| 8 | 20.0 | 9 | 21 |

The wire springs and the bulb are connected, one end of a first spring is connected to the bulb, and the other end of the first spring is connected to one end of a wheel spoke away from the center of a wheel hub; and one end of a second spring is connected to the bulb, and the other end of the second spring is connected to one end of a wheel spoke close to the center of the wheel hub. The bulb is connected with the power supply through the conducting wire, and the power supply is a lithium battery mounted on the inner side of the wheel hub.

The aforementioned light emitting device is embedded and fixedly mounted on the molded wheel, one light emitting device is mounted on each wheel spoke, and the protective cover 7 made from transparent polypropylene plastic is used for packaging. The power supply 4 is controlled by the remote switch 8.

Eight kinds of wheels in the embodiment are mounted on a sample vehicle, the remote switch 8 is turned on, and the vehicle is started. It can be observed that the bulb is lighted and a ring of light is formed due to the phenomenon of persistence of vision. When the vehicle is accelerated to 60 km/h, the ring of light is expanded. When the vehicle is accelerated to 120 km/h, the ring of light is further expanded. Wherein, for the fifth and sixth groups of light emitting wheels accelerated to 120 km/h, the ring of light is expanded to the maximum.

Tests prove that, the higher the speed of the vehicle is, the larger the ring of light is, and thus the side of the vehicle is rich in dynamic effect and is eyecatching. When the speed of the vehicle is lower, the ring of light cannot be formed by the phenomenon of persistence of vision, at this moment, the bulb like a shooting star rotates on the surface of the wheel, thereby being poetic and beautiful.

Those skilled in the art should be aware that, the elastic coefficients, the mounting positions and the length of the first elastomer and the second elastomer can be selected according to the designed speed of the vehicle, so as to locate the bulb on an expected position at an expected speed. For example, for high-speed vehicles such as a racing vehicle and the like, a higher elastic coefficient can be selected, so that at the running speed of the racing vehicle, the bulb just reaches at the edge of the wheel. For low-speed vehicles such as a vehicle for elderly mobility and the like, a lower elastic coefficient can be selected, so that at the running speed of the vehicle, the bulb just reaches at the edge of the wheel.

Those skilled in the art should be aware that, the "first elastomer" and the "second elastomer" in the present invention can be polymer bands with elasticity or springs, and can also be elastomer systems composed of one or more elastomers. The above technical solutions all fall into the scope of the "elastomer" of the present invention on the premise of not departing from the inventive concept of the present invention.

It is contemplated that any embodiment discussed in the description can be implemented by any method of the present invention, and vice versa. In addition, the device of the present invention can be used for implementing the method of the present invention.

It should be understood that the specific embodiments described herein are displayed by way of illustration rather than limiting the method of the present invention. The main features of the present invention can be applied to various embodiments without departing from the scope of the present invention. Those skilled in the art will recognize that, or numerous equivalents of the specific steps herein can be determined merely by routine experiments. Such equivalents are considered to be within the scope of the present invention and are encompassed by the claims.

All publications and patent applications mentioned in the description indicate the level of those skilled in the art to which the present invention pertains. All publications and patent applications are herein incorporated by reference to the same extent as if each individual publication or patent application is specifically and individually indicated to be incorporated by reference.

When in combined with the term "comprising" in the claims and/or the description, the words "a" or "an" can refer to "an", but also is consistent with the meanings of "one or more", "at least one" and "one or more than one". The term "or" used in the claims refers to "and/or", unless explicitly indicated only refers to alternatives, or the alternatives are mutually exclusive, although the disclosure supports only referring to the alternatives and the definition of "and/or". Throughout the present application, the term "about" is used for describing such a value, which comprises inherent variations for measuring errors of a device and a method of the value, or variations existing between study subjects.

As used in the description and the claims (or a plurality of claims), the words "comprising" (and any form of "comprising", such as "comprise and comprises"), "having" (and any form of "having", such as "have" and "has"), "including" (and any form of "including", such as "includes" and "include") or "containing" (and any form of "containing", such as "contains" and "contains") are included or open-ended, and additional non-mentioned elements or method steps are not excluded.

The term "or combinations thereof" used in this paper refers to all permutations and combinations of listed items preceding the term. For example, "A, B, C, or combinations thereof" is intended to include at least one of A, B, C, AB, AC, BC or ABC, and further includes at least one of BA, CA, CB, CBA, BCA, ACB, BAC or CAB, if the order is important in a particular context. Continuing with this example, repeated combinations comprising one or more items or terms are obviously included, for example, BB, AAA, MB, BBC, AAABCCCC, CBBAAA, CABABB, etc. Those skilled in the art will understand that, typically there is no limit on the number of items or terms in any combination, unless otherwise apparent from the context.

According to the disclosure of the present invention, all devices and/or methods disclosed and claimed herein can be made and executed by non-excessive experiments. Although the device and the method of the present invention have been described in the form of preferred embodiments, it is apparent to those skilled in the art that, variations can be made to the device and/or the method in this paper and the steps of the method or the order of the steps of the method, without departing from the concept, spirit and scope of the present invention. It is apparent to those skilled in the art that, all such similar substitutes and modifications are deemed to be within the spirit, scope and concept of the present invention defined by the appended claims.

The invention claimed is:

1. A light emitting wheel, characterized in that, a light emitting device is attached to the light emitting wheel, the light emitting device is composed of a bulb, a first elastomer, a second elastomer, a power supply, a conducting wire and a protective cover, and: one end of the first elastomer is connected to the bulb, and the other end of the first elastomer is connected to a first point on the outer side of a wheel; one end of the second elastomer is connected to the bulb, and the other end of the second elastomer is connected to a second point on the outer side of the wheel; the conducting wire forms a circuit between the bulb and the power supply; the protective cover is transparent and is covered above the bulb, the first elastomer, the second elastomer, the power supply and the conducting wire; and the distance from the first point on the outer side of the wheel to the center of the wheel is different from that from the second point on the outer side of the wheel to the center of the wheel;

preferably, the light emitting device further comprises a remote switch which controls the electric connection between the power supply and the bulb; or preferably, the difference between the distance from the first point on the outer side of the wheel to the center of the wheel and that from the second point on the outer side of the wheel to the center of the wheel is greater than 5 cm; more preferably, the difference is 5-14 cm; and yet more preferably, the difference is 7-10 cm.

2. The light emitting wheel according to claim 1, characterized in that 1-9 groups of the light emitting devices are attached to the light emitting wheel; preferably, 5-7 groups of the light emitting devices are attached.

3. The light emitting wheel according to claim 1, characterized in that, the first point on the outer side of the wheel is located at one end of a wheel spoke away from the center of the wheel, and the second point on the outer side of the wheel is located at one end of a wheel spoke close to the center of the wheel.

4. The light emitting wheel according to claim 1, characterized in that, the first elastomer and the second elastomer are springs; preferably, the elastomers are light springs.

5. The light emitting wheel according to claim 1, characterized in that, the elastic coefficient of the first elastomer is $k_1$, the elastic coefficient of the second elastomer is $k_2$, the mass of the bulb is m, and the numerical value of $(k_1+k_2)/m$ is $2.0\text{-}20.0\times10^3 N/(m\times kg)$; preferably, the numerical value of $(k_1+k_2)/m$ is $4.5\text{-}12\times10^3 N/(m\times kg)$; more preferably, the numerical value of $(k_1+k_2)/m$ is $5\text{-}10\times10^3 N/(m\times kg)$.

6. The light emitting wheel according to claim 1, characterized in that, the material of the protective cover is transparent polypropylene or polyester; preferably, the protective cover is fixed on the hub of the wheel in an adhesion manner.

7. The light emitting wheel according to claim 1, characterized in that, the power supply is a lithium battery mounted with a remote control device.

8. The light emitting wheel according to claim 1, characterized in that, the conducting wire is integrated in the first elastomer and/or the second elastomer.

9. The light emitting wheel according to claim 1, characterized in that, the distance from the second point on the outer side of the wheel to the center of the wheel is 13-21 cm and is preferably 15-20 cm, for example, 16-18 cm.

10. The light emitting wheel according to claim 1, characterized in that, at a static state, the distance from the bulb to the center of the wheel is 3-9 cm and is preferably 4-7 cm, for example, 5 cm.

* * * * *